(12) United States Patent
Heitmann

(10) Patent No.: US 7,457,314 B2
(45) Date of Patent: Nov. 25, 2008

(54) METHOD FOR IMPROVING THE QUALITY OF VOICE TRANSMISSION VIA A RADIO INTERFACE

(75) Inventor: Jürgen Heitmann, Neuried (DE)

(73) Assignee: Siemens Aktiengesellschaft, Munich (DE)

( * ) Notice: Subject to any disclaimer, the term of this patent is extended or adjusted under 35 U.S.C. 154(b) by 322 days.

(21) Appl. No.: 10/573,626

(22) PCT Filed: Aug. 5, 2004

(86) PCT No.: PCT/EP2004/051730

§ 371 (c)(1),
(2), (4) Date: Mar. 28, 2006

(87) PCT Pub. No.: WO2005/034416

PCT Pub. Date: Apr. 14, 2005

(65) Prior Publication Data

US 2007/0025322 A1 Feb. 1, 2007

(30) Foreign Application Priority Data

Sep. 29, 2003 (DE) ................. 103 45 166

(51) Int. Cl.
| | | |
|---|---|---|
| H04B 7/00 | (2006.01) | |
| H04B 1/38 | (2006.01) | |
| H04J 3/34 | (2006.01) | |
| H04J 1/02 | (2006.01) | |
| H04J 3/18 | (2006.01) | |
| H04J 1/00 | (2006.01) | |
| H04M 1/00 | (2006.01) | |

(52) U.S. Cl. .............. 370/473; 370/310; 370/477; 370/493; 370/480; 455/550.1; 455/556.2; 455/561

(58) Field of Classification Search .............. 370/310, 370/328–329, 338, 341, 349, 394, 395.5, 370/395.52, 902, 908, 202, 229, 317, 332–333, 370/343, 352–356, 395.21, 395.41, 468, 370/470–477, 480, 493–495, 521, 912–913; 704/500–504; 709/247; 348/14.13, 568; 455/403, 466, 41.2, 501–507, 509–510, 517, 455/72, 67.11, 65, 63.1, 62, 550.1, 561, 556.2, 455/101, 7–10, 11.1, 67.13, 68–70, 88, 115.1, 455/115.3, 130–136, 150.1, 161.1, 220–222, 455/225, 266–268, 423–425, 450, 452.2, 455/464, 514, 553.1, 701–703
See application file for complete search history.

(56) References Cited

U.S. PATENT DOCUMENTS 5,293,484 A 3/1994 Dabbs, III et al.

(Continued)

FOREIGN PATENT DOCUMENTS

DE 3689453 T2 3/1987

(Continued)

*Primary Examiner*—Meless N Zewdu

(57) ABSTRACT

After a predetermined period of time has lapsed after transmission of a voice data packet representing a first voice section a second voice data packet representing the same voice section is transmitted. On the receiving end, a value for the transmission quality is determined for the first and for the second voice data packet and the one of the two voice data packets is processed that has the better transmission quality.

15 Claims, 1 Drawing Sheet

U.S. PATENT DOCUMENTS

| | | |
|---|---|---|
| 5,859,875 A | 1/1999 | Kato et al. |
| 6,101,168 A | 8/2000 | Chen et al. |
| 6,167,060 A * | 12/2000 | Vargo et al. ................. 370/468 |
| 6,452,911 B1 * | 9/2002 | Seo ............................ 370/335 |
| 6,600,738 B1 * | 7/2003 | Alperovich et al. ......... 370/352 |
| 6,691,273 B2 * | 2/2004 | Wager et al. ................ 714/751 |
| 6,901,242 B2 * | 5/2005 | Kroeger et al. ................ 455/45 |
| 7,124,202 B2 * | 10/2006 | Lebizay et al. .............. 709/246 |
| 2002/0172162 A1 * | 11/2002 | Goodings ................... 370/280 |
| 2003/0031198 A1 | 2/2003 | Currivan et al. |

FOREIGN PATENT DOCUMENTS

| | | |
|---|---|---|
| DE | 10029756 A1 | 12/2001 |
| DE | 10147487 A1 | 4/2003 |
| EP | 0 738 056 A2 | 10/1996 |
| WO | 03007531 A1 | 1/2003 |

* cited by examiner

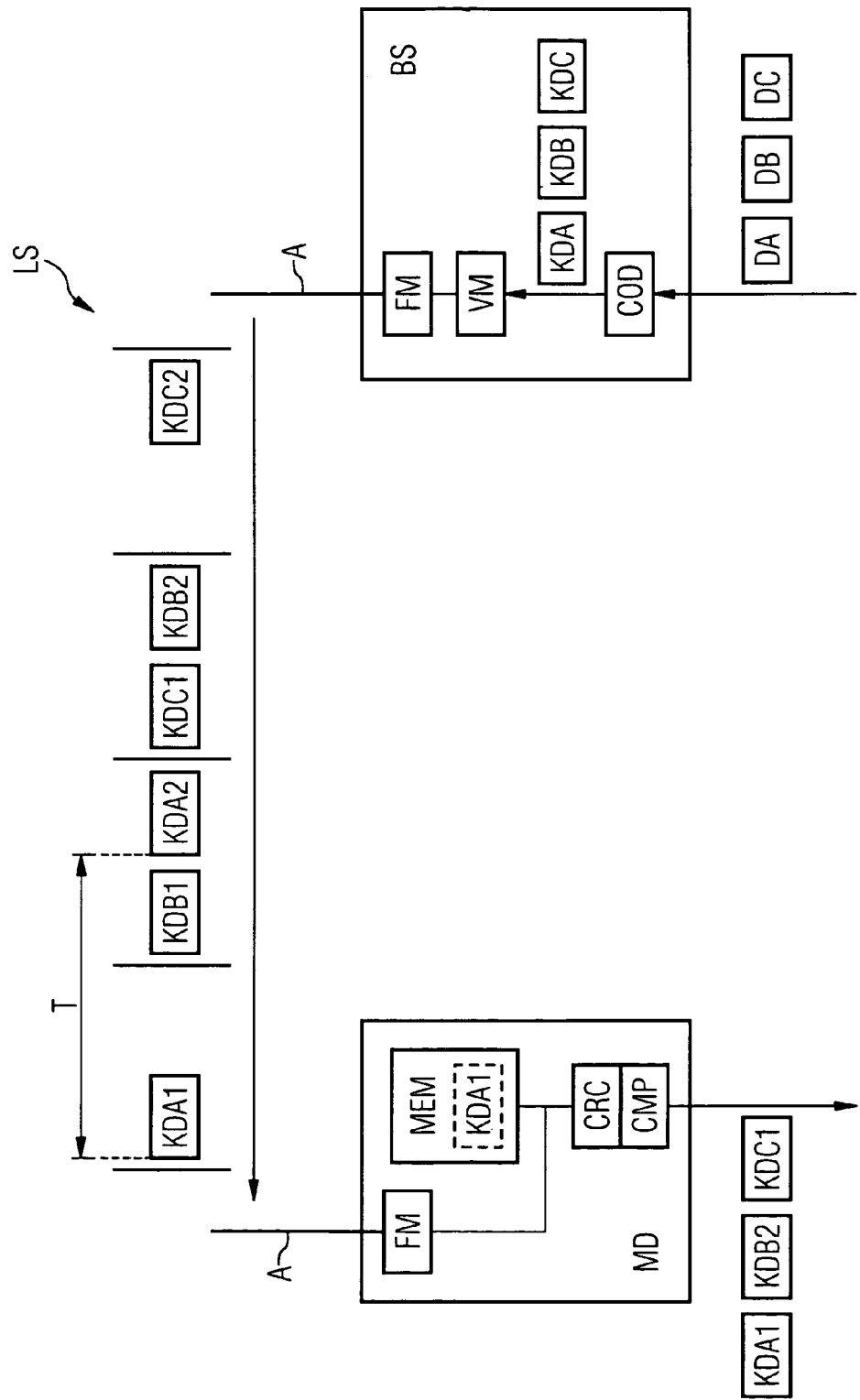

METHOD FOR IMPROVING THE QUALITY OF VOICE TRANSMISSION VIA A RADIO INTERFACE

CROSS REFERENCE TO RELATED APPLICATIONS

This application is the US National Stage of International Application No. PCT/EP2004/051730, filed Aug. 5, 2004 and claims the benefit thereof. The International Application claims the benefits of German application No. 10345166.8 DE filed Sep. 29, 2003, both of the applications are incorporated by reference herein in their entirety.

FIELD OF INVENTION

The present invention relates to a method for improving the quality of voice transmission via a radio interface.

BACKGROUND OF INVENTION

Modern communications systems increasingly comprise mobile communications devices, in particular mobile voice communications devices. With wireless voice transmission voice signals to be transmitted in real time are usually digitized and transmitted via a radio interface in the form of data packets. Various transmission standards, such as DECT (Digital European Cordless Telecommunications) or GSM (Global System for Mobile Communications) have established themselves in the field of bi-directional wireless voice communication. Furthermore current tendencies can be observed which aim at also using what are known as WLANs (Wireless Local Area Networks) for wireless voice transmission.

Said wireless transmission techniques use transmission frequencies of the order magnitude of up to a few gigahertz. This corresponds to transmission wavelengths of approximately 30 cm and below.

SUMMARY OF INVENTION

In environments where reception is difficult and with a large number of radio wave-reflecting surfaces, for example in or between buildings, frequent radio reflections lead to multipath reception and radio wave superimpositions. In this case destructive interference or oscillation nodes frequently occur which at some spatial locations can lead to local signal extinctions. A mobile terminal which, once a speech connection has been established, is moved by its user in an environment of this type, where reception is difficult, frequently sweeps such locations with signal extinction, or at least signal reduction, during the movement. This usually becomes noticeable during a conversation as a result of clicking noises or an interruption in transmission, which the user generally finds very irritating, and considerably impairs the speech quality experienced.

To reduce these impairments what are known as equalizers are used in narrow band voice transmission systems, such as GSM, to suppress multipath reception. However, in the case of radio transmissions with a higher bandwidth requirement, for example with DECT or WLAN systems, an equalizer of this sort requires much greater production expenditure. In addition, an equalizer would not improve the receiving situation in the case of local signal extinction.

A further possibility for avoiding reception impairments in an environment where reception is difficult, consists in using at least two antennae that are physically separate from each other, optionally with separate receivers. During operation a switch is in each case made to the antenna or receiver of which the signal has the best signal-to-noise ratio. This technology is frequently also called antenna diversity or space diversity. However, as an additional antenna, and as a rule an additional receiving circuit, is required in this case, production is relatively expensive.

An object of the present invention is to disclose a method for improving the quality of wireless voice transmission which can be achieved with little expenditure.

This object is achieved by a method with the features of the claims.

According to the invention, to improve the quality of a voice transmission via a radio interface a second voice data packet representing the voice portion is transmitted via the radio interface a predetermined period after transmission of a first voice data packet representing a voice portion. The radio interface can in this case be achieved for example according to the DECT or GSM standard or according to a WLAN standard, such as IEEE-802.11. A measure of the transmission quality is determined at the receiver side for the first and second voice data packets respectively and of the two voice data packets, the one which has the best transmission quality is processed further. The measure of the transmission quality can be derived for example from the received field strength, the signal-to-noise ratio and/or the frequency of transmission errors when a respective data packet is received.

The delayed transmission of a voice data packet representing the same voice portion can considerably reduce an error frequency in the voice data packets to be processed further, in particular in the case of moving users and thus significantly improve the voice transmission quality. The distribution of the first and second voice data packets between various time intervals makes the voice transmission less sensitive to brief radio interference, for example as a result of ignition sparks, and in particular to a brief passage of a receiving antenna of the radio interface moved with the user through spaces with local signal extinction (oscillation nodes). Thus even in an environment where reception is difficult high voice transmission quality can be ensured without additional antennae or receiving circuits being necessary.

Advantageous embodiments and developments of the invention are disclosed in the dependent claims.

According to a first embodiment, the second voice data packet can be transmitted on a different transmission channel, or via a different logical link of the radio interface, to the first voice data packet. An effect of channel-specific interference can thus be reduced. With a DECT radio interface, a speech connection with a transmission rate of 32 kbit/s, for example, can be distributed between at least two data channels with a total of at least 64 kbit/s. With a WLAN radio interface a speech connection can accordingly be distributed between at least two logical channels or logical links.

Voice data to be transmitted can preferably be compressed at the sender side by means of a specific voice compression method, for example in accordance with the ITU-T recommendation G.729, and decompressed at the receiver side. The voice compression method is preferably adapted to the requirements of real-time voice transmission and configured such that a continuous input voice data stream is converted into a continuous output voice data stream with a low data rate and with the least possible delay.

The compressed voice data can advantageously be inserted at the sender side into the first and second voice data packets, so the first and second voice data packets can be transmitted on the same transmission channel of the radio interface as a result of the reduced transmission rate achieved by the compression. This is advantageous insofar as no additional transmission channel of the radio interface is occupied. Thus with a transmission according to the DECT standard, for example, instead of the ADPCM voice compression method used in this case (ADPCM: Adaptive Differential Pulse Code Modulation), a different voice compression method, for example according to the G.729 standard, which converts at a lower data rate than the ADPCM method, can be used. When using a voice compression according to the G.729 standard, conversion is carried out at a data rate of 8 kbit/s, so the transmission rate of 32 kbit/s of a single transmission channel of the DECT radio interface is sufficient for transmission of both the first and second voice data packets.

According to a further embodiment of the method according to the invention, the measure for the transmission quality of the first and second voice data packets can be determined by forming and checking a checksum and/or a CRC control bit pattern from data contained in the voice data packets. Checksum and/or CRC information required for this purpose can, for example, be transmitted on an associated signaling channel or on the payload channel itself.

According to an advantageous development of the invention, a check can be made as to whether data to be transmitted via the radio interface is voice data or not. The second voice data packet can subsequently be transmitted as a function of the result of the check. The decision as to whether data to be transmitted is voice data can be made in this case using signaling information, priority information or quality of service details associated with the data, for example, or with the aid of the data packet size. Transmission of the second voice data packet can preferably be suppressed in the case of a negative result of the check.

BRIEF DESCRIPTION OF THE DRAWING

An embodiment of the invention will be described in more detail hereinafter with reference to the drawings.

The figure shows, in a diagrammatic view, a base station and mobile terminal equipment, between which a wireless speech connection is established.

DETAILED DESCRIPTION OF INVENTION

The figure shows diagrammatically a base station BS and mobile terminal equipment MD. The base station BS can, for example, be achieved according to the DECT or GSM standards or as what is known as a WLAN access point. The mobile terminal equipment MD can, for example, be a cordless telephone according to the DECT standard, a mobile phone according to the GSM standard or another piece of mobile terminal equipment, such as a laptop or PDA (Personal Digital Assistant) with a WLAN interface.

The mobile terminal equipment MD is coupled via a radio interface LS to the base station BS and it is assumed that there is a wireless real time speech connection. The radio interface LS is indicated in the figure by a horizontal arrow and can, for example, be configured according to the DECT or GSM standard or according to an IEEE-802.11 WLAN standard. The radio interface LS preferably comprises a plurality of transmission channels for voice and/or data transmission, so a plurality of logical links can be established. However, for reasons of clarity the figure shows only one of these transmission channels.

To produce the radio interface LS the mobile terminal equipment MD and the base station BS each have a radio module FM with radio antenna A.

The base station BS also has a delay module VM coupled to the radio module FM thereof and a codec COD coupled to the delay module VM for voice compression and decompression.

Within the context of speech connection voice data DA, DB and DC is fed to the base station BS, which data is to be transmitted from the base station BS to the mobile terminal equipment MD via the radio interface LS. The voice data to be transmitted can, for example, exist as voice data packets according to the TCP/IP protocol family or as a voice data stream. Both TCP/IP voice data packets and individual portions of a voice data stream are designated voice data packets hereinafter and are referenced by reference characters DA, DB, and DC.

A check is firstly made for the voice data packets DA, DB and DC fed to the base station BS as to whether they contain voice data or not. With DECT systems this can, for example, be recognized using signaling associated with one of the data packets to be checked. In the present embodiment the voice data packets DA, DB and DC are recognized as such and are consequently fed to the codec COD. The codec COD compresses the voice data contained in the voice data packets DA, DB and DC in a more or less continuous manner and outputs the compressed voice data packets KDA, KDB and KDC which are forwarded to the delay module VM. The respective compressed voice data packet KDA, KDB or KDC in each case contains the compressed voice data from the voice data packet DA, DB or DC. It is assumed hereinafter that the compressed voice data packets KDA, KDB and KDC are compressed by at least a factor of 2 with respect to the voice data packets DA, DB and DC.

The codec COD can, for example be configured according to the ITU-T recommendation G.729. A codec of this type converts compressed voice data at a voice data rate of 8 kbit/s. With DECT systems a voice compression of this type can be used instead of the conventional ADPCM coding with a voice data rate of 32 kbit/s.

A respective compressed voice data packet KDA, KDB or KDC is, on the one hand, immediately forwarded by the delay module VM to the radio module FM in order to be transmitted as a first voice data packet KDA1, KDB1 or KDC1, representing the respective voice data packet DA, DB or DC, by the radio module via the radio interface LS and, on the other hand, a respective compressed voice data packet KDA, KDB or KDC fed to the delay module VM is buffered thereby for a predetermined delay time T in order to be transmitted again as a second voice data packet KDA2, KDB2 or KDC2, representing the relevant voice data packet DA, DB or DC, by the radio module FM via the radio interface LS once this delay time T has expired. The voice data contents of every compressed voice data packet KDA, KDB or KDC is thus transmitted via the radio interface LS with double the interval of the delay time T in each case.

On the one hand the delay time T should preferably be selected to be small enough that the user does not find a transmission delay caused by it irritating. On the other hand, the delay time T should be selected to be large enough that, as far as possible, it does not affect both voice data packets KDA1, KDA2 or KDB1, KDB2 or KDC1, KDC2, representing a respective voice data packet DA, DB or DC, for example as a result of radio interference or passages of the receiving antennae A through oscillation nodes. The length of a radio frame of the radio interface LS or a multiple of this length, for example 20 ms, or a multiple thereof in the case of DECT systems, can preferably be selected as the delay time T.

If the result of the above-mentioned check indicates that the data packets to be transmitted do not contain voice data, these data packets are fed to the radio module FM by bypassing the codec COD and the delay module VM. Double transmission of these data packets via the radio interface LS is thus avoided.

In the present embodiment illustrated by the figure, the first and second voice data packets KDA1, KDB1, KDC1 and KDA2, KDB2, KDC2 are transmitted via the radio interface LS on the same channel or within the same logical link. As the voice data packets KDA1, KDB1, KDC1 and KDA2, KDB2, KDC2 are compressed by at least a factor of 2 with respect to the voice data packets DA, DB and DC, as assumed above, double the number of compressed voice data packets can be transmitted on a single transmission channel actually only provided for a speech connection.

Alternatively, the first and second voice data packets KDA1, KDB1, KDC1 and KDA2, KDB2, KDC2 could be transmitted via the radio interface LS on various channels or via various logical links. This alternative is particularly significant for WLAN systems as voice data already compressed in advance and which does not allow further compression by at least a factor of 2 is frequently to be transmitted in systems of this type. In such cases the voice data to be transmitted can also be checked to establish whether compression by a factor of 2 is still possible. Depending on the result of the check, the voice data can then either be additionally compressed and transmitted on the same transmission channel or not be compressed further and be transmitted on different transmission channels.

In the present embodiment the first and the second voice data packets KDA1, KDB1, KDC1 and KDA2, KDB2, KDC2 are transmitted in radio frames of the radio interface LS which are actually only provided for one data packet in each case. The radio frames are indicated in the figure by vertical lines. The first voice data packet KDA1 is transmitted in the radio frame sent first, the first voice data packet KDB1 and the second voice data packet KDA2 in the next radio frame, the first voice data packet KDC1 and the second voice data packet KDB2 in the subsequent radio frame and the second voice data packet KDC2 in the last radio frame. For a respective first voice data packet KDA1, KDB1 or KDC1 a respective second voice data packet KDA2, KDB2 or KDC2, which is identical thereto in terms of content, is thus transmitted via the radio interface LS in the interval T to the mobile terminal equipment MD.

The mobile terminal equipment MD has a memory MEM, for storing a respective first voice data packet KDA1, KDB1 or KDC1, an error detecting device CRC and a comparator CMP coupled thereto. The memory MEM and the error detecting device CRC are coupled to the radio module FM of the mobile terminal equipment MD.

The first voice data packets KDA1, KDB1, KDC1 received by the radio module FM are buffered in the memory MEM in each case until the associated second voice data packet KDA2, KDB2, KDC2 is received. Each received voice data packet KDA1, KDB1, KDC1, KDA2, KDB2 and KDC2 is moreover fed to the error detecting device CRC which determines a measure of the transmission quality of the relevant voice data packet in each case.

In the present embodiment the first voice date packet KDA1 is firstly buffered in the memory MEM until the associated second voice data packet KDA2 is received. After receiving the second voice data packet KDA2 the measure of the transmission quality determined therefor is compared by the comparator CMP with the measure of the transmission quality determined for the stored first voice data packet KDA1. Of the two voice data packets KDA1 and KDA2 the one with the better transmission quality is subsequently passed on by the comparator CMP. For the present embodiment it is assumed that the fist voice data packet KDA1 has a better transmission quality than the associated second voice data packet KDA2 and is consequently passed on. Analogously hereto the transmission quality of the further first voice data packets KDB1, KDC1 is in each case also compared with the transmission quality of the respectively associated second voice data packet KDB2 or KDC2 and in each case the voice data packet with the better transmission quality, in this case KDB2 and KDC1, is passed on. The voice data packets KDA1, KDB2 and KDC1 passed on can subsequently be decompressed by a further codec (not shown) and assembled into a voice data stream which can finally be acoustically output.

The invention claimed is:

1. A method for improving a speech transmission quality via a radio interface in a communications network wherein the speech transmission is in the form of voice data packets, the method comprising:
   compressing a voice data packet;
   transmitting the compressed voice data packet via the radio interface by a sending device;
   receiving the transmitted voice data packet by a receiving device;
   storing the transmitted voice data packet by the receiving device;
   automatically re-transmitting the compressed voice data packet after a time delay from the transmission of the voice data packet;
   receiving the re-transmitted voice data packet by the receiving device;
   determining a measure of the quality of the voice data packets by the receiving device; and
   selecting the packet having a better speech transmission quality for use by the receiving device;
   wherein a compression ratio for the voice data packet is selected such that the voice data packet and the re-transmitted voice data packet occupy a bandwidth less than or equal to a bandwidth occupied by the voice data packet prior to the step of compressing, wherein if a compression ratio that permits the voice data packet and the re-transmitted voice data packet to occupy a bandwidth less than or equal to the bandwidth occupied by the voice data packet prior to the step of compressing is not available, then the step of transmitting the voice data packet further comprises transmitting the voice data packet on a first transmission channel or a first logical link of the radio interface and the step of re-transmitting the voice data packet further comprise re-transmitting the voice data packet on a second transmission channel or a second logical link of the radio interface.

2. The method according to claim 1, further comprising a step of decompressing the voice data packet at the receiving device.

3. The method according to claim 1, wherein the voice data is compressed at least by a factor of 2.

4. The method according to claim 1,
   wherein the measure of the transmission quality is determined by forming and checking a checksum from data contained in the voice data packet or
   wherein the measure of the transmission quality is determined by forming and checking a Cyclic Redundancy Check (CRC) control bit pattern from data contained in the voice data packet or
   wherein the measure of the transmission quality is determined by forming and checking a checksum and a Cyclic Redundancy Check (CRC) control bit pattern from data contained in the voice data packet.

5. The method according to claim 1,
wherein the data to be transmitted is checked to see if it is voice data, and
wherein the re-transmission step, the receiving the re-transmission step, the determining step, and the selecting step are bypassed for non voice data.

6. A sending device for improving a speech transmission quality via a radio interface, wherein the speech transmission is in the form of voice data packets, the sending device comprising:
a codec that compresses voice data;
a transmitter that transmits a first transmission of a voice data packet and a second transmission of the same voice data packet, wherein the voice data packet comprises compressed voice data;
a delay module that delays the second transmission of the voice data packet by a delay time after the first transmission;
wherein a compression ratio of the codec for compressing the voice data packet is selected such that the first and the delayed transmissions of the voice data packet occupy a bandwidth less than or equal to a bandwidth occupied by the first transmission of the voice data packet;
wherein the first transmission and the delayed transmission of the voice data packet are transmitted on a first transmission channel of the radio interface;
wherein if a compression ratio that permits the first and the second transmissions of the voice data packet to occupy a bandwidth less than or equal to the bandwidth occupied by the first transmission of the voice data packet is not available, then the first transmission of the voice data packet is transmitted on the first transmission channel or a first logical link of the radio interface and the delayed transmission of the voice data packet is transmitted on a second transmission channel or a second logical link of the radio interface.

7. The device according to claim 6, wherein the compressed voice data is compressed at least by a factor of 2.

8. The device according to claim 6, wherein the delay time is greater or equal to a time corresponding to a length of a radio frame of the radio interface.

9. The device according to claim 8, wherein the delay time is a multiple of the frame length time.

10. The device according to claim 6, wherein the codec and the delay module are bypassed by non-voice data.

11. A receiving device for improving a speech transmission quality via a radio interface comprising:
a codec for compressing a first packet and a second packet;
a receiver that receives the first packet including a first voice data and the second packet including a second voice data,
wherein the second packet is received after a time delay from the receipt of the first packet;
an error detection device that determines a measure of the quality of the voice data for each packet;
a comparator that compares the measure of the quality of the first voice data with the measure of quality of the second voice data;
a selector that selects the voice data with a better transmission quality for use;
wherein the first voice data and the second voice data are the same data having different transmission quality; and
wherein a compression ratio for the first packet and the second packet is selected such that the first packet and the second packet occupy a bandwidth less than or equal to a bandwidth occupied by the first packet prior to compressing by the codec, wherein if a compression ratio that permits the first packet and the second packet to occupy a bandwidth less than or equal to the bandwidth occupied by the first packet prior to compressing is not available, then the first packet is transmitted on a first transmission channel or a first logical link of the radio interface and the second packet is transmitted on a second transmission channel or a second logical link of the radio interface.

12. The device according to claim 11, further comprising a memory for storing the first voice data.

13. The device according to claim 11, wherein the time delay is greater or equal to a time corresponding to a length of a radio frame of the radio interface.

14. The device according to claim 11, wherein the codec compresses the first packet and the second packet at least by a factor of 2.

15. The method according to claim 11,
wherein the measure of the transmission quality is determined by forming and checking a checksum from data contained in the voice data packet or
wherein the measure of the transmission quality is determined by forming and checking a Cyclic Redundancy Check (CRC) control bit pattern from data contained in the voice data packet or
wherein the measure of the transmission quality is determined by forming and checking a checksum and a Cyclic Redundancy Check (CRC) control bit pattern from data contained in the voice data packet.

* * * * *